United States Patent [19]

Okuno

[11] Patent Number: 5,310,998
[45] Date of Patent: May 10, 1994

[54] METHOD AND SYSTEM FOR PLACING A BUS ON HOLD DURING THE INSERTION/EXTRACTION OF AN IC CARD INTO/FROM A COMPUTER

[75] Inventor: Takashi Okuno, Tokyo, Japan

[73] Assignee: Kabushiki Kaisha Toshiba, Kawasaki, Japan

[21] Appl. No.: 15,282

[22] Filed: Feb. 16, 1993

Related U.S. Application Data

[63] Continuation of Ser. No. 603,837, Oct. 26, 1990, abandoned.

[30] Foreign Application Priority Data

Oct. 31, 1989 [JP] Japan .............................. 1-126627[U]

[51] Int. Cl.⁵ .............................................. G06K 5/00
[52] U.S. Cl. ..................................... 235/380; 235/492; 369/77.1; 395/425; 395/725
[58] Field of Search ............... 395/750, 275, 425, 725, 395/775; 235/380, 437, 438, 441, 475, 476, 482, 492; 369/75.1, 75.2; 360/99.02, 99.03, 99.07

[56] References Cited

U.S. PATENT DOCUMENTS

| | | | |
|---|---|---|---|
| 4,772,783 | 9/1988 | Ono et al. | 235/492 |
| 4,791,283 | 12/1988 | Burkhardt | 235/492 |
| 4,794,236 | 12/1988 | Kawana et al. | 235/492 |
| 4,794,525 | 12/1988 | Pickert et al. | 395/750 |
| 4,803,349 | 2/1989 | Sugimoto et al. | 235/475 |
| 4,803,351 | 2/1989 | Shigenaga | 235/380 |
| 4,849,615 | 7/1989 | Mollet | 235/441 |
| 4,864,116 | 9/1989 | Banjo et al. | 235/441 |
| 4,990,760 | 2/1991 | Tomari et al. | 235/492 |
| 5,010,239 | 4/1991 | Mita | 235/441 |
| 5,088,084 | 2/1992 | Komiya et al. | 369/75.1 |

FOREIGN PATENT DOCUMENTS

| | | |
|---|---|---|
| 51-48234 | 4/1976 | Japan . |
| 56-172125 | 5/1980 | Japan . |
| 59-87526 | 5/1984 | Japan . |
| 63-220385 | 9/1988 | Japan ................................ 235/441 |

Primary Examiner—Eugene R. LaRoche
Assistant Examiner—Tan Nguyen
Attorney, Agent, or Firm—Finnegan, Henderson, Farabow, Garrett & Dunner

[57] ABSTRACT

In a computer system capable of connecting an IC (Integrated Circuit) card, when the IC card is extracted from an IC card holder, a door is opened. A detection signal is output from a detecting circuit to a bus controller by detecting opening of the door. Upon receiving the detection signal, a hold request signal is output from the bus controller to a CPU (Central Processing Unit). In response to the hold request signal, a hold acknowledge signal is output from the CPU to the bus controller after the computer process to be executed is completed. A buffer control signal for disabling a buffer is output from the bus controller by receiving the hold acknowledge signal, thereby interrupting an access signal from the CPU, to hold a bus.

28 Claims, 2 Drawing Sheets

METHOD AND SYSTEM FOR PLACING A BUS ON HOLD DURING THE INSERTION/EXTRACTION OF AN IC CARD INTO/FROM A COMPUTER

This application is a continuation of application Ser. No. 07/603,837, filed Oct. 26, 1990, now abandoned.

BACKGROUND OF THE INVENTION

1. Field of the Invention

The present invention relates to a method of and a system for holding a bus during the insertion/extraction of an IC card in a computer.

2. Description of the Related Art

In recent years, small, light-weight, and portable lap-top type computers have been used in place of desk-top type computers in the field of personal computers. In a lap-top type personal computer, a flat panel display, a thin type floppy disk drive, an IC (Integrated Circuit) card and the like are utilized as an input/output device.

For example, in a lap-top type personal computer using an IC card as an external memory medium, data stored in the IC card is destructed or a CPU (Central Processing Unit) hangs up at insertion or extraction of the IC card in the computer while the power supply is turned on and the IC card is accessed by the CPU.

The CPU also hangs up at insertion/extraction of the IC card when an input/output device other than an IC card is accessed by the CPU and the input/output device and the IC card are connected directly to a common bus. The reason for this is that in a number of lap-top type personal computers, the input/output devices are directly connected to a bus without using any buffer in order to decrease the number of computer parts for reduction in the size and weight.

Accordingly, it is therefore desirable to provide a computer capable of preventing destruction of data in an IC card and hang-up of the CPU when the IC card is inserted to and extracted from a computer and the power supply is on.

SUMMARY OF THE INVENTION

It is an object of the present invention to provide a method and a system for holding a bus during the insertion/extraction of an IC card in a computer.

According to one aspect of the present invention, there is provided a method for holding a bus during the insertion/extraction of a process card in a computer, the process card being used to process data, the method comprising the steps of: determining whether or not the process card is inserted to the computer; determining whether or not the process card is extracted from the computer; and holding the bus in accordance with determination results to inhibit a CPU (central processing unit) access to a device connected to the bus.

According to another aspect of the present invention, there is provided a system for holding a bus during the insertion/extraction of a process card in a computer, the process card being used to process data, the system comprising: a process card holder for connecting the process card to the computer to perform a data communication between the computer and the process card; determining means for determining whether or not the process card is inserted to the process card holder, and determining whether or not the process card is extracted from the process card holder; and bus holding means for holding the bus in accordance with determination results to inhibit a CPU (central processing unit) access to a device connected to the bus.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will be described with reference to the accompanying drawing.

Figure 1:
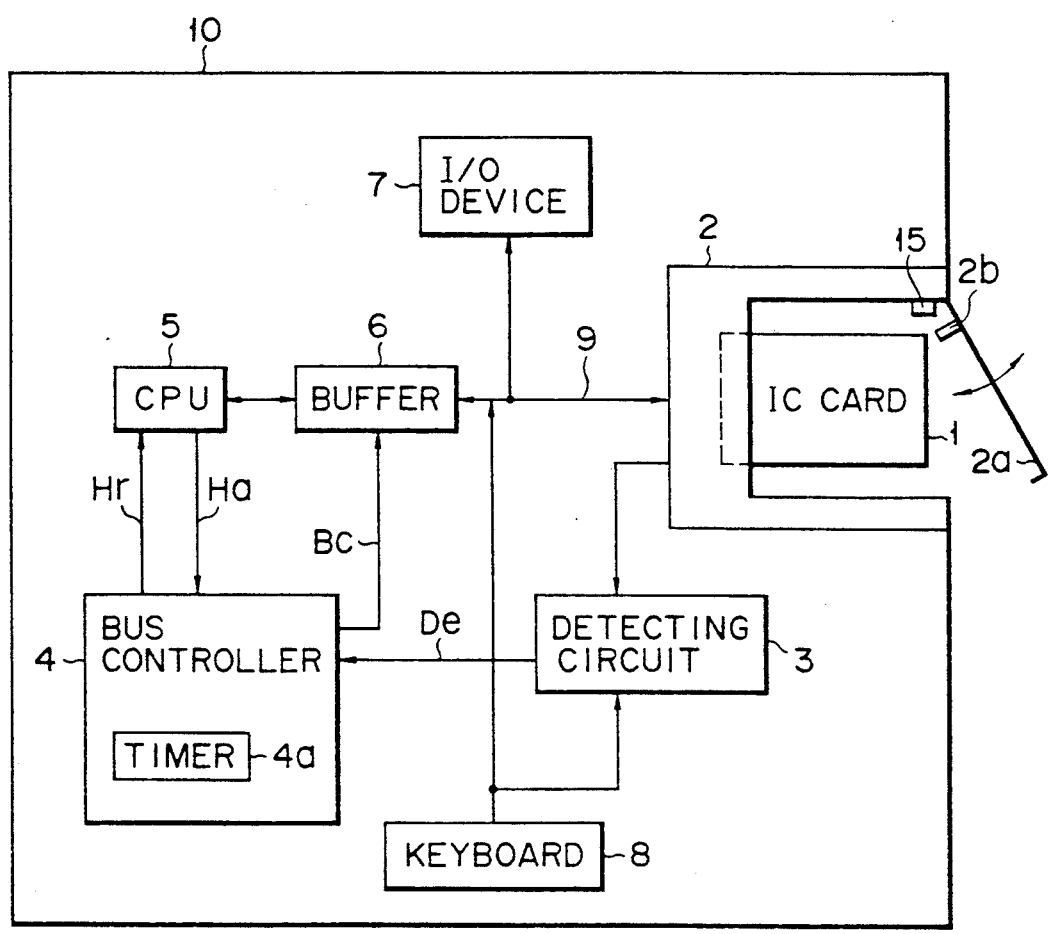
FIG. 1 is a block diagram showing the construction of a computer system embodying the present invention.

Referring to FIG. 1, a computer system 10 according to the embodiment of the present invention includes an IC (Integrated Circuit) card 1, an IC card holder 2, a detecting circuit 3, a bus controller 4, a CPU (Central Processing Unit) 5, a buffer 6, an input/output (I/O) device 7, a keyboard 8, a bus 9, and a switch 15.

The IC card holder 2 has a door 2a, and is used to connect the IC card 1 to the computer system 10. The insertion/extraction of the IC card 1 into/from the IC card holder 2 is performed by opening the door 2a. The IC card 1 cannot be connected to the IC card holder 2 unless the door 2a is opened. The door 2a has a protruding portion 2b.

Figure 2A:
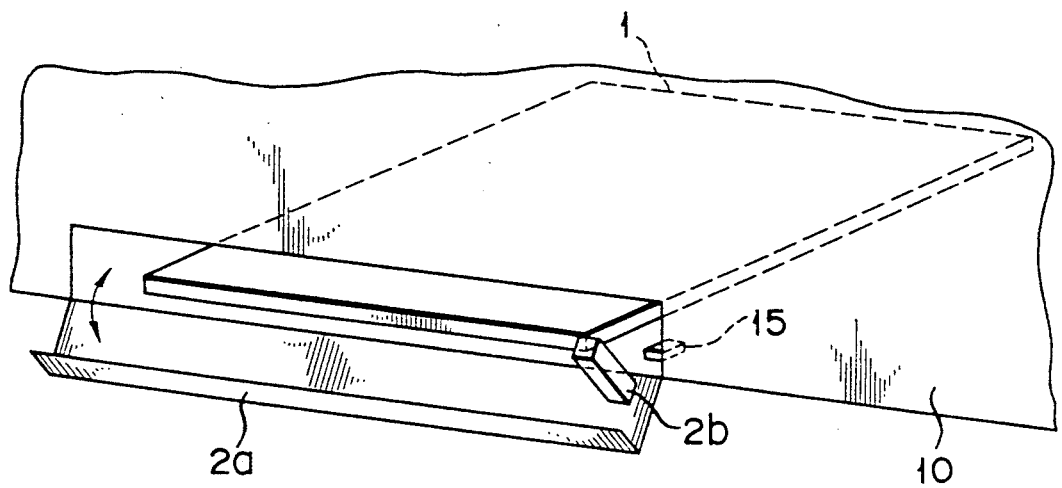
FIGS. 2A and 2B are diagrams showing operation of a switch for detecting the insertion/extraction of an IC card.
Figure 2B:
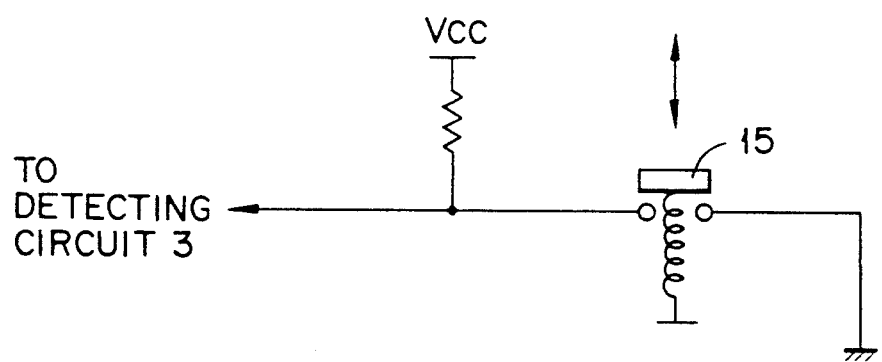

The switch 15 is turned on/off by the protruding portion 2b. That is, when the door 2a is opened, the switch 15 is turned off so that the protruding portion 2b is apart from the switch 15 as shown in FIGS. 2A and 2B.

The detecting circuit 3 detects the insertion/extraction of the IC card 1 into/from the IC card holder 2 and output to the bus controller 4 a detection signal De representing the insertion/extraction of the IC card 1. In this embodiment, the insertion/extraction is detected by the opening of the door 2a, i.e., by turning on/off the switch 15.

Upon receipt of the detection signal D from the detecting circuit 3, the bus controller 4 having a timer 4a outputs a hold request signal Hr for holding the bus 9. In response to a hold acknowledge signal Ha from the CPU 5, the bus controller 4 outputs a buffer control signal Bc to the buffer 6. Output of the buffer control signal Bc can be stopped by a hold release signal which is input by the keyboard 8 through the detecting circuit 3. When the timer 4a of the bus controller 4 starts to operate in accordance with the timing of output of the buffer control signal Bc, the output of the buffer control signal Bc can be stopped after a predetermined period of time elapses.

The CPU 5 controls the operation of the whole computer system 10 and outputs the hold acknowledge signal Ha to the bus controller 4 in response to the hold request signal Hr from the bus controller 4.

The buffer 6 is used to interrupt the data communication between the CPU 5 and the bus 9 in accordance with the buffer control signal Bc from the bus controller 4.

The input/output device 7 is constituted by, for example, a flat panel display.

The IC card holder 2, buffer 6, input/output device 7 and keyboard 8 are directly connected to the bus 9.

The operation of the present embodiment computer system is described.

The door 2a is opened by an operator when the IC card 1 is to be connected and extracted from the IC holder 2. The opening of the door 2a is detected by the detecting circuit 3 which outputs a detection signal De to the bus controller 4. In the bus controller 4, a hold request signal Hr is output to the CPU 5 upon receipt of the detection signal De from the detecting circuit 3. In response to the hold request signal Hr, a hold acknowledge signal Ha is output from the CPU 5 to the bus controller 4 after the completion of the process which is executed. In response to the hold acknowledge signal Ha, a buffer control signal Bc for disabling the buffer 6 is output from the bus controller 4, whereby the bus 9 is in a hold state, i.e., the output of an access signal from the CPU to the bus 9 is interrupted.

The bus 9 is held when the IC card 1 is extracted from the I card holder 2, thus preventing destruction of data stored in the IC card 1.

The bus 9 is in a hold state until the next insertion of the IC card 1 to the card holder 2. That is, the bus 9 to be held is released when the IC card 1 is inserted to the IC card holder 2. The bus 9 to be held also can be released even when IC card 1 is not connected to the IC card holder 2, by a key-input through the keyboard 8 or a switch operation through a console panel (not shown). Further, as described above, using the timer 4a, the bus 9 to be held can be released by stopping output of the buffer control signal Bc after a predetermined period of time elapses.

When the IC card 1 is inserted to the IC card holder 2, the bus 9 is held in the same manner as explained above in connection with extraction of the IC card 1. The bus 9 to be held also is released in the above mentioned manner. In addition, the held bus at insertion of the IC card 1 can be released by using hold release information prestored in the IC card 1.

According to the present embodiment, destruction of the data in an IC card and hang-up of the CPU can be prevented when the operator inserts or extracts the IC card into and from the computer while a device other than the IC card is accessed by the CPU through a bus, by detecting the insertion/extraction of the IC card and holding the bus used to access the device in accordance with the detection result. The present invention can be applied to various personal computer systems in which a bus is directly connected to devices without intermediating buffers.

Although the present embodiment has been described about the IC card, the present invention can be applied to a memory card, various interface cards, and the like.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for placing a bus on hold during insertion of a process card into and extraction of a process card from a holder having a door in a computer, the process card being used to process data and being inserted into and extracted from the holder by opening the door, the method comprising the steps of:
   determining whether the door is opened; and
   placing the bus on hold in accordance with a determination result from the determining step to inhibit access by a CPU to a device connected to the bus.

2. The method of claim 1, wherein said device is directly connected to said bus.

3. The method of claim 1, further comprising the step of releasing the hold on said bus in response to a hold release signal, in order to enable said CPU to access said device.

4. A system for placing a bus on hold during insertion of a process card into and extraction of a process card from a computer, the process card being used to process data, the system comprising:
   a process card holder for connecting the process card to the computer in order to perform a data communication between the computer and the process card, said process card holder including a door, wherein the process card is inserted into and extracted from the process card holder by opening the door;
   determining means for determining whether the door is opened; and
   bus holding means for placing the bus on hold in accordance with a determination result from said determining means in order to inhibit access by a CPU to a device connected to the bus.

5. The system of claim 4, wherein said device is directly connected to said bus.

6. The system of claim 4, further comprising releasing means for releasing the hold on said bus in response to a hold release signal, in order to enable said CPU to access said device.

7. The system of claim 6, wherein said releasing means includes a timer, and the hold on said bus is released after a predetermined period of time elapses using said timer.

8. The system of claim 6, wherein the system further comprises a keyboard, and the hold on said bus is released in response to a hold release signal from the keyboard.

9. The system of claim 5, wherein the bus is placed on hold by the bus holding means when the door is opened.

10. The method of claim 1, wherein the bus is placed on hold by the holder when the door is opened.

11. A computer system comprising:
   a bus;
   a holder for connecting a process card to said bus, said holder having a door which is opened to insert and extract the card into and from said holder;
   a detector for detecting whether said door is opened; and
   bus holding means for placing said bus on hold in accordance with a detection result from said detector.

12. The computer system of claim 11, wherein said bus is placed on hold by said bus holding means when the door is opened.

13. The computer system of claim 12, wherein a device is directly connected to said bus.

14. The computer system of claim 12, further comprising means for releasing the hold on said bus in response to a hold release signal.

15. A computer comprising:
   a bus;

a central processing unit (CPU) electrically connected to the bus;

a unit storage portion storing a removable data storage unit storing data accessed by the CPU, the removable data storage unit being inserted into and extracted from the unit storage portion;

a connector electrically connected to the bus and electrically connecting the removable data storage unit stored in the unit storage portion so that the CPU is able to access the removable data storage unit;

a detector detecting an inserting status, prior to the connection between the removable data storage unit and the connector, indicating that the removable data storage unit is going to be inserted into the unit storage portion and/or an extracting status, prior to the disconnection between the removable data storage unit and the connector, indicating that the removable data storage unit connected to the connector is going to be extracted from the unit storage portion; and bus holding means for placing the bus on hold in accordance with a detection result from the detector.

16. A computer according to claim 15, further comprising an input and/or output device electrically connected to the bus, the CPU being inhibited from accessing the input and/or output device while the bus is placed on hold by the bus holding means.

17. A computer according to claim 16, wherein the bus holding means includes a timer and releases the hold on the bus after the timer determines that a predetermined period of time has elapsed.

18. A computer according to claim 15, further comprising a moveable cover being moveable between a closed position for covering the unit storage portion and an open position for exposing the unit storage portion, the detector detecting the inserting and/or extracting status when the moveable cover is in the open position.

19. A computer according to claim 18, further comprising an input and/or output device electrically connected to the bus, the CPU being inhibited from accessing the input and/or output device while the bus is placed on hold by the bus holding means.

20. A computer according to claim 15, further comprising a release signal output device outputting a release signal to the bus holding means causing the bus holding means to release the hold on the bus.

21. A computer according to claim 20, wherein the release signal output device including a keyboard, and the release signal is received from the keyboard.

22. A computer comprising:
a bus;
a buffer electrically connected to the bus;

a central processing unit (CPU) electrically connected to the buffer;

a unit storage portion storing a removable data storage unit storing data accessed by the CPU, the removable data storage unit being inserted into and extracted from the unit storage portion;

a connector electrically connected to the bus and electrically connecting the removable data storage unit stored in the unit storage portion so that the CPU is able to access the removable data storage unit through the buffer, the bus, and the connector;

a detector detecting an inserting status, prior to the connection between the removable data storage unit and the connector, indicating that the removable data storage unit is going to be inserted into the unit storage portion and/or an extracting status, prior to the disconnection between the removable data storage unit and the connector, indicating that the removable data storage unit connected to the connector is going to be extracted from the unit storage portion; and a bus controller outputting a hold signal for disabling the buffer so as to place the bus on hold when the detector detects the inserting and/or extracting status.

23. A computer according to claim 22, further comprising an input and/or output device electrically connected to the bus, the CPU being inhibited from accessing the input and/or output device when the buffer is disabled.

24. A computer according to claim 23, wherein the release signal output device includes a keyboard, and the release signal is received from the keyboard.

25. A computer according to claim 22, further comprising a movable cover being movable between a closed position for covering the unit storage portion and an open position for exposing the unit storage portion, the detector detecting the inserting and/or extracting status when the movable cover is in the open position.

26. A computer according to claim 25, further comprising an input and/or output device electrically connected to the bus, the CPU being inhibited from accessing the input and/or output device when the buffer is disabled.

27. A computer according to claim 22, further comprising a release signal output device outputting a release signal to the bus controller so that the bus controller releases the disablement of the buffer.

28. A computer according to claim 22, wherein the bus controller includes a timer and releases the disablement of the buffer after the timer determines that a predetermined period of time has elapsed.

* * * * *